Patented Jan. 20, 1931

1,789,813

UNITED STATES PATENT OFFICE

WILHELM GAUS, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

REMOVING IRON FROM MATERIALS

No Drawing. Application filed October 1, 1925, Serial No. 59,967, and in Germany October 4, 1924.

The present invention relates to a process for the removal of iron from materials and to render them more suitable for industrial purposes. Many materials, especially ores such for example as bauxite, titanic iron ore and others, contain a greater or lesser amount of an admixture of iron mostly in the form of iron oxid which is very undesirable for the use of such materials for further treatment.

I have now found that iron can be removed either completely or to a large extent by treating the materials containing iron oxid with a current of carbon monoxid at an elevated pressure of say 10 atmospheres or more and at elevated temperatures generally ranging from about 100 degrees to 400 degrees centigrade. The iron oxid contained in the material is first reduced to metallic iron and then converted into iron carbonyl in which form the iron can be easily removed from the materials. Any treatment with acids or other liquids is hereby rendered superfluous. The treatment with carbon monoxid can be effected in any suitable manner but it is preferable to employ a rapid current of carbon monoxid of sufficient speed to take along all of the iron carbonyl formed and to avoid the deposition of liquid iron carbonyl in the material to be treated as in this case the reaction proceeds most rapidly. The carbon monoxid may be pure or contain other reducing or inert gases for example hydrogen or nitrogen. The step of reducing the iron oxid contained in the mineral ore to metallic iron may be carried out by means of the gas serving for the subsequent production of iron carbonyl or it may be effected with another reducing gas and under considerably different conditions. The iron carbonyl formed or the gases containing it may be decomposed by the application of heat, say about 200 degrees centigrade or more, preferably at ordinary pressure whereby the iron carbonyl is split into metallic iron and carbon monoxid, and the latter can be used again for the treatment of materials to be freed from their iron content. The iron obtained by the said decomposition of iron carbonyl is of a high purity and in view thereof the present process is in some cases a practical method for obtaining iron from minerals, the metallurgical treatment of which in the usual way would not pay.

The following examples will serve to illustrate some modes of carrying the invention into practice, but my invention is not restricted to these examples.

*Example 1*

Bauxite containing iron oxid is heated to 250 degrees centigrade and water gas passed over the material at a pressure of 100 atmospheres. After continuing the treatment for a sufficient length of time the residue contains only a small amount of iron. The bauxite may also be subjected to a separate reduction treatment with reducing gases at a more elevated temperature with or without employing increased pressure, prior to the aforesaid treatment.

*Example 2*

100 lbs. of ground titaniferous iron sand with about 25.2 per cent of iron are first reduced by means of a current of dry hydrogen at ordinary pressure and at 900 degrees centigrade for about 13 hours. Thereupon the reduced mass is subjected to treatment with carbon monoxid at 200 degrees centigrade and 200 atmospheres. In the course of an hour 81.5 lbs. of iron carbonyl are formed and in the course of three more hours an additional quantity of about 4.4 lbs. of iron carbonyl. In this manner 97.5 per cent of the iron contained in the titaniferous ore is obtained in the form of iron carbonyl which is condensed in a suitable receiver. The residual ore contains only 0.6 per cent of iron. In view thereof it can be worked up in a considerably cheaper and simpler way than the original ores for example when pure titanic acid is to be produced by decomposition with sulfuric acid and subsequent hydrolysis of the titanium sulfate formed.

*Example 3*

100 lbs. of roasted pyrites with 54.5 per cent of iron and 3.08 per cent of copper are reduced with hydrogen at 500 degrees centigrade for 12 hours. The mass is then treated with a current of carbon monoxid at 200 degrees centigrade and 200 atmospheres whereby 95 per cent of the iron content are volatilized in the form of 181 lbs. of iron carbonyl. A residue of 8 lbs. is left which contains 38.4 per cent of copper and in view of this high percentage can be readily worked up to obtain metallic copper.

I claim:

The process for removing iron from bauxite containing iron, which comprises acting on the said bauxite with water gas at a temperature of about 250° C. and a pressure of about 100 atmospheres and removing the iron carbonyl formed.

In testimony whereof I have hereunto set my hand.

WILHELM GAUS.